United States Patent [19]
Schweitzer et al.

[11] Patent Number: 5,867,313
[45] Date of Patent: Feb. 2, 1999

[54] MULTIPURPOSE NIGHT VISION MONOCULAR

[75] Inventors: Paul Thomas Schweitzer, Salem; Mark Alan Bryant, Roanoke; Harrison Lewis Buchanan, Jr., Roanoke; Paul Edward Kaminski, Roanoke, all of Va.

[73] Assignee: ITT Corporation, New York, N.Y.

[21] Appl. No.: 509,145

[22] Filed: Jul. 31, 1995

[51] Int. Cl.$^6$ ................................................ G02B 23/00
[52] U.S. Cl. ........................... 359/418; 359/353; 359/399
[58] Field of Search ................................. 359/399, 400, 359/402, 405, 407, 409, 419, 418, 353; 250/214 VT

[56] References Cited

U.S. PATENT DOCUMENTS

| | | | |
|---|---|---|---|
| 4,468,101 | 8/1984 | Ellis | 359/409 |
| 4,702,571 | 10/1987 | Barber | 359/419 |
| 5,084,780 | 1/1992 | Phillips | 359/400 |
| 5,121,220 | 6/1992 | Nakamoto | 359/419 |
| 5,146,077 | 9/1992 | Caserta et al. | 250/213 VT |
| 5,204,774 | 4/1993 | Owen, Jr. et al. | 359/409 |
| 5,307,204 | 4/1994 | Dor | 359/400 |
| 5,331,684 | 7/1994 | Baril et al. | 359/409 |
| 5,365,057 | 11/1994 | Morley et al. | 359/400 |
| 5,404,225 | 4/1995 | Bushman | 359/407 |
| 5,408,359 | 4/1995 | Ferrett et al. | 250/214 VT |
| 5,410,436 | 4/1995 | Devenyi | 359/407 |
| 5,444,568 | 8/1995 | Williams, Jr. et al. | 359/400 |
| 5,495,364 | 2/1996 | Palmer | 359/412 |
| 5,535,053 | 7/1996 | Baril et al. | 359/411 |
| 5,537,249 | 7/1996 | Masunaga et al. | 359/407 |
| 5,537,261 | 7/1996 | Palmer | 359/409 |

OTHER PUBLICATIONS

Night Vision Goggles, Generation III; F5001B ITT Night Vision, Roanoke VA, Dec. 1993.

Aviator's Night Vision Imaging System; AN/AVS–6 Electro-Optical Products Division, ITT Defense & Electronics, Roanoke, VA, Oct. 1993.

*Primary Examiner*—Timothy P. Callahan
*Assistant Examiner*—My-Trang Nu Ton
*Attorney, Agent, or Firm*—Plevy & Associates

[57] ABSTRACT

The present invention is a multifunctional night vision monocular that is adapted for use by a soldier as a hand-held spotting scope, a helmet mounted scope, a head mounted scope, and a weapon mounted scope depending upon circumstances and the needs of the soldier. The night vision monocular is a self-contained unit capable of carrying its own power source. A universal mount on the bottom of the night vision monocular enables either a helmet mounting adaptor or a weapon sight mount to be quickly added to the monocular. The night vision monocular contains a GEN III image intensifier tube positioned between an objective lens assembly and an eyepiece lens assembly. The housing of the night vision monocular opens in a plane perpendicular to the optical axis, thereby enabling easy access to the various optical elements for repairs, maintenance and replacement. A reduced number of wire leads are used within the night vision monocular thereby reducing manufacturing costs and improving reliability. The image intensifier tube is directly coupled to a circuit board that provides power to the image intensifier tube. As such, the image intensifier tube can be replaced without cutting leads or soldering.

8 Claims, 4 Drawing Sheets

MULTIPURPOSE NIGHT VISION MONOCULAR

FIELD OF THE INVENTION

The present invention relates to night vision devices that enable a viewer to observe objects at night or during other low-light conditions. More particularly, the present invention relates to a multifunctional monocular night vision device that can be used as a hand held monocular, a head mounted monocular, a helmet mounted monocular, or as a weapon mounted sight depending upon the needs of the user.

BACKGROUND OF THE INVENTION

Night vision devices are widely used in the military to provide soldiers, aviators and sailors with the ability to view objects at night or during other low light conditions. However, night vision devices traditionally have been designed to accommodate only one specific application within the military. For example, soldiers in the army are issued night vision goggles that mount to their helmets to enable the soldiers to see at night. Such night vision goggles are exemplified by the AN/PVS-7B night vision goggle system manufactured by ITT Corporation, the assignee herein (ITT Model No. F5001B). The AN/PVS-7B night vision goggle system is a binocular viewing system that mounts to a soldier's head or helmet. Although, such night vision goggle systems are good for allowing a soldier to see in the dark, that same night vision goggle system prevents the soldier from looking through the sight of his/her gun. As a result, the same soldiers that were issued night vision goggles may also require a second night vision system for their weapon. As such, during combat the soldier must remove the night vision goggles and view a target through the night vision sight attached to the soldier's gun. A typical night vision gun sight is exemplified by the AN/PVS-4 night vision weaponsight currently used by the Army. The AN/PVS-4 night vision weaponsight is also manufactured by ITT Corporation, As can be seen, soldiers operating at night may be required to carry and operate multiple night vision systems. This adds weight and bulk to the soldiers and requires the soldier to be trained in how to properly operate and use more than one night vision system.

It is therefor an objective of the present invention to provide a single night vision device that can selectively be worn on a helmet, worn with a head mount, mounted to a gun or used as a hand held spotting scope, wherein a soldier need only carry a single lightweight night vision device and can use the night vision device as needed.

It is a further object of the present invention to provide a multifunctional night vision device that is lightweight, simple to use, easy to manufacture, easy to repair and easy to maintain at peak performance.

SUMMARY OF THE INVENTION

The present invention is a multifunctional night vision monocular that is adapted for use by a soldier as a hand-held spotting scope, a helmet mounted scope, a head mounted scope, and a weapon mounted scope depending upon circumstances and the needs of the soldier. The night vision monocular is a self-contained unit capable of carrying its own power source. A universal mount on the bottom of the night vision monocular enables either a head/helmet mounting adaptor or a weapon sight mount to be quickly added to the monocular. The head/helmet mounting adaptor can be connected to the night vision monocular in one of two orientations, thereby enabling the night vision monocular to be mounted to a soldier's helmet over either the left or right eye. The night vision monocular also contains two oppositely positioned Reed switches, that enable the night vision monocular to be automatically disabled when removed from the helmet or head mount and when flipped up into the stowed position.

Internally, the night vision monocular contains a GEN III image intensifier tube positioned between an objective lens assembly and an eyepiece lens assembly. The housing of the night vision monocular opens in a plane perpendicular to the optical axis, thereby enabling easy access to the various optical elements for repairs, maintenance and replacement. A reduced number of wire leads are used within the night vision monocular thereby reducing manufacturing costs and improving reliability. The image intensifier tube is directly coupled to a circuit board that provides power to the image intensifier tube. This enables the image intensifier tube to be replaced without cutting and resoldering of leads. The direct connection of the image intensifier tube to a circuit board also provides a unique construction wherein fiber optic conduits on the circuit board can be used to produce indicators that are superimposed over the image being viewed.

BRIEF DESCRIPTION OF THE DRAWINGS

For a better understanding of the present invention, reference may be had to the following description of an exemplary embodiment thereof, considered in conjunction with the accompanying drawings in which.

DETAILED DESCRIPTION OF THE INVENTION

Figure 1:
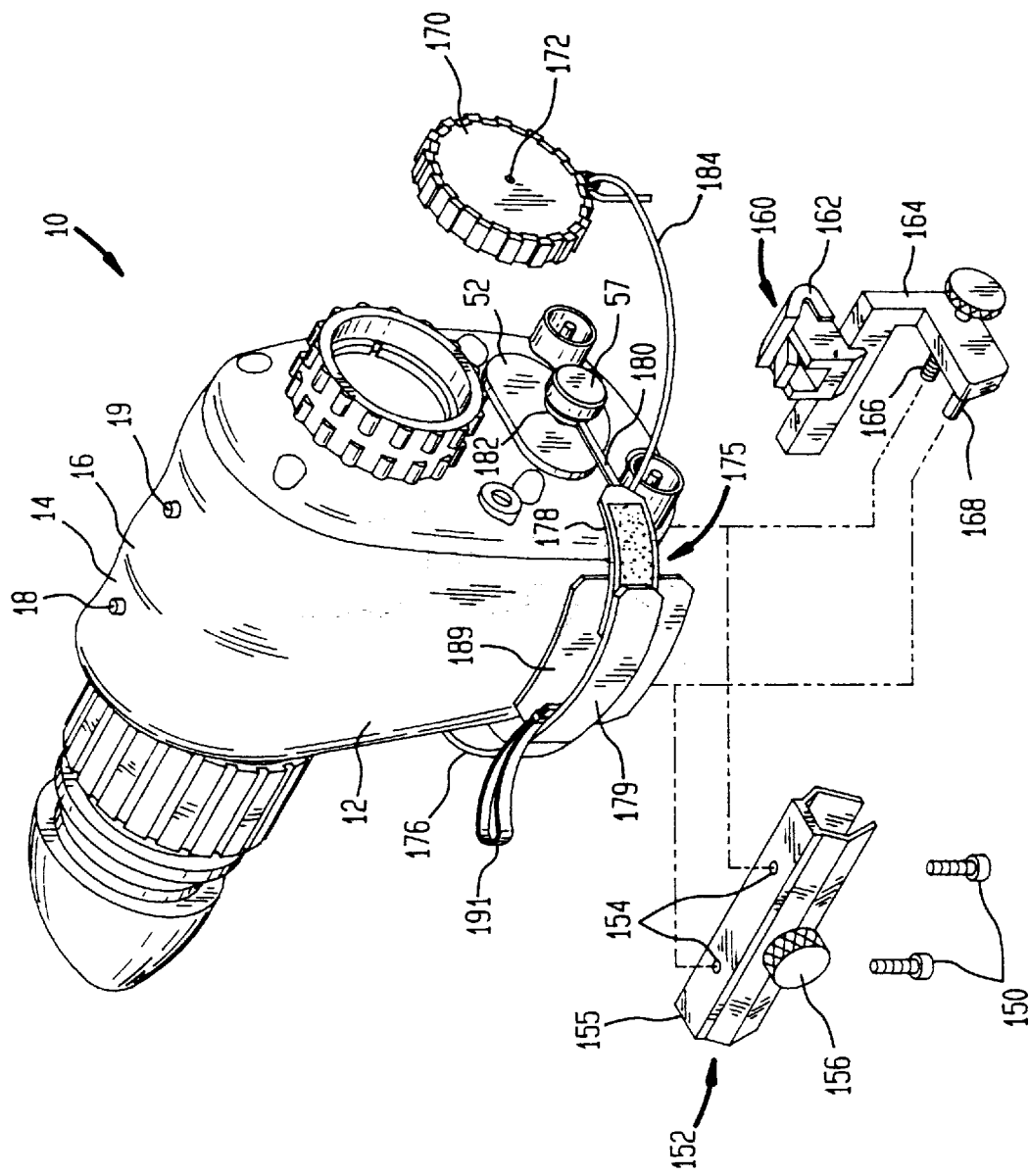
FIG. 1 is a front perspective view of one preferred embodiment of the present invention night vision monocular assembly, shown in conjunction with a sight rail and a helmet mount adaptor.

Referring to FIG. 1, there is shown one preferred embodiment of the present invention night vision monocular 10. The night vision monocular 10 has a housing 12 that is sized to easily fit within one hand. In order to facilitate the night vision monocular 10 being comfortably held and operated in one hand, the housing 12 preferably has a height of between 7 cm and 10 cm and a width of between 4 cm and 7 cm. Two depression 14 are disposed on the top surface 16 of the housing 12, wherein the depressions 14 are ergonomically adapted to receive the index finger and middle finger as the night vision monocular 10 is grasped in one hand. Two push buttons 18, 19 are disposed on the top surface 16 of the housing 12. One button is disposed in the bottom center of each of finger depressions 14, thereby enabling a person to easily control the operation of the buttons 18, 19 while gripping the night vision monocular 10. As will be later explained, a person controls the electrical functions of the night vision device by selectively depressing one or both of the buttons 18, 19.

Figure 2:
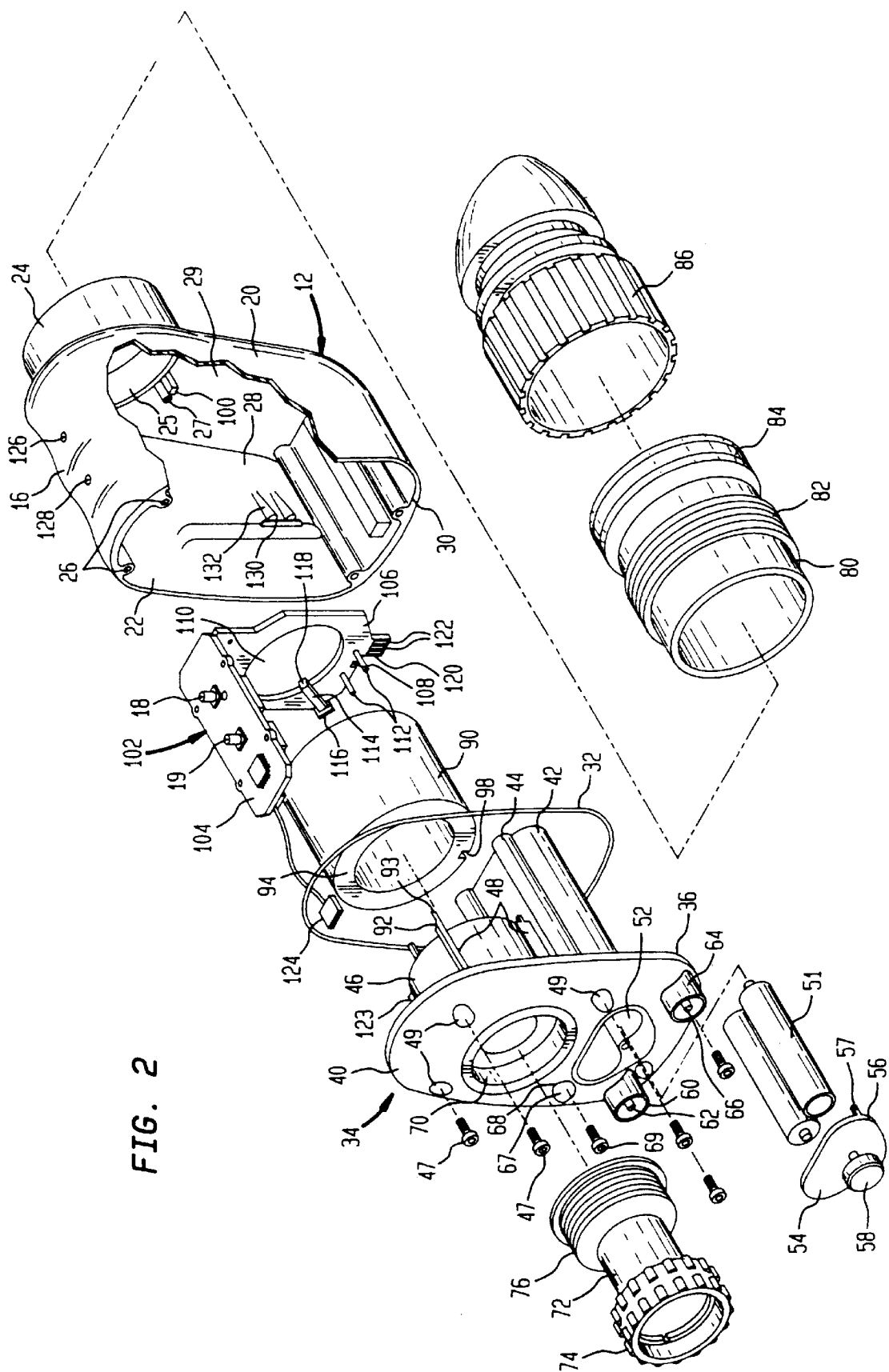
FIG. 2 is a perspective, exploded view of the embodiment shown in FIG. 1.

Referring to FIG. 2, it can be seen that the housing 12 is comprised to two separable pieces. The majority of the housing 12 is comprised of a molded plastic casing 20, a primary housing section, having a large open end 22. Opposite the large open end 22 is reduced neck region 24 that defines a circular aperture 25 in which the eyepiece optics are retained. Reinforced screw apertures are molded as part of the casing 20, wherein four of the screw apertures 26 communicate with the open end 22 of the casing 20. Two other screw apertures 27 communicate with the enclosure 28 defined by the casing 20, wherein the screw apertures 27 face the open end 22 of the casing 20. A continuous groove 30 is disposed in the edge surface of the casing 20 that terminates at the open end 22. The continuous groove 30 is sized to receive a gasket ring 32 which acts to seal the seam along the open end 22 of the casing 20 when the night vision monocular 20 is assembled.

A front end assembly 34, the secondary housing section, is provided as part of the housing 12. The front end assembly 34 attaches to the open end 22 of the casing 20, thereby closing the open end 22. A continuous male protrusion 36 extends from the surface of the front end assembly 34 that abuts against the casing 20. The protrusion 36 is shaped to compress the gasket ring 32 into the continuous groove 30, thereby making a water impervious seal between the front end assembly 34 and the casing 20. The front end assembly 34 is preferably an integrally molded unit, comprising a face plate 40, a battery receptacle 42, screw access tunnels 44, a tubular extension 46 and spacer arms 48 that surround the tubular extension 46. Screw holes 49 are disposed through the face plate 40. The screw holes 49 align with the screw apertures 26 in the casing 20, enabling the front end assembly 34 can be attached to the casing 20 with screws 47. Two of the screw holes 49 align with screw access tunnels 44, wherein the screws affix the rearward portion of the screw access tunnels 44 to the screw apertures 27 on the rear wall 29 of the casing 20.

The battery receptacle 42 is sized to receive two commercially available "AA" batteries 51. The battery receptacle 42 has an open front port 52 that extends though the face plate 40 of the front end assembly 34 and enables access to the batteries 51. A port cover 54 is provided to cover the front port 52. The port cover 54 retains a gasket ring 56 around its peripheral edge that creates a water impervious seal when retained against the front port 52. A threaded fastener 57 is used to join the port cover 54 to the front port 52. The threaded fastener 56 preferably has a large turning head 58 so the threaded fastener 57 can be tightened or removed by hand when changing batteries.

Three annular protrusions extend forward from the face plate 40. The first annular protrusion 60 surrounds and protects a light sensor 62. As is well known with night vision devices, a light sensor is used to detect levels of ambient light that may damage the night vision device, wherein a circuit is provided to disable the night vision device should such a level of ambient light be detected. The second annular protrusion 64 surrounds and protects an infrared illumination source 66. The use of an illumination source is also a well known feature of many night vision devices. The infrared illumination source 66 emits infrared light that is detectable by the night vision monocular 10 and is used in instances of near total darkness. The third annular protrusion 67 surrounds a threaded vent aperture 68. A seal screw 69 engages the vent aperture 68 creating a hermetic seal. The presence of the vent aperture 68 enables the housing 12 to be purged should condensation or other contaminants make their way into the housing 12, once it has been assembled.

A large objective aperture 70 is disposed on the face plate 40 of the front end assembly 34 at a point along the vertical center of the face plate 40. The objective aperture 70 is concentric with the tubular extension 46 that protrudes from the rearward surface of the face plate 40. The objective aperture 70 communicates with the central opening of the tubular extension 46, forming an open conduit that retains an objective lens assembly 72 in a manner which will be later explained. The objective lens assembly 72 itself includes a focus knob 74 at one end and a threaded region 76 at the opposite end. The threaded region 76 engages the tubular extension 46 within the structure of the front assembly 34. The focus knob 74 extends outside of the housing and is capable of being manually engaged and turned. As a result, turning of the focus knob 74 turns the threaded region 76 and varies the position of the objective lens assembly 72 with respect to the front end assembly 34.

The eyepiece lens assembly 80 also contains an externally threaded region 82. The threaded section 82 engages the interior of the reduced neck region 24. A coupling flange 84 is disposed at the distal end of the eyepiece lens assembly 80. A focus knob 86 attaches to the coupling flange 84, thereby joining the focus knob 86 to the eyepiece lens assembly 80. The eyepiece lens assembly 80 threads into the interior of the housing neck region 24. However, the focus knob 86 is sized to pass over the exterior of the housing neck region 24. As a result, the focus knob 86 remains accessible as the night vision monocular 10 is assembled. By rotating the focus knob 86 on the exterior of the housing 12, the eyepiece lens assembly 80 within the housing 12 is rotated. Since the eyepiece lens assembly 80 is threaded, the rotation of the eyepiece lens assembly 80 causes the position of the eyepiece lens assembly 80 to change with respect to the housing 12.

A GEN III image intensifier tube 90 is retained within the housing 12. The optical axis associated with the GEN III image intensifier tube 90 is linearly aligned with the optical paths of both the objective lens assembly 72, and the eyepiece lens assembly 80. The image intensifier tube 90 receives low intensity light and near infrared light collected through the objective lens assembly 72 and converts that light into a visible image. The visible image is then viewed, via the eyepiece lens assembly 80. Several GEN III image intensifier tubes are currently being manufactured. Any such tube which provides image inversion can be adapted for use in the present invention. However, in the preferred embodiment the ITT model F9855A GEN III image intensifier tube is used.

Three spacer arms 48 surround the tubular extension 46 on the rearward surface of the face plate 40. Each of the spacer arms 48 extend past the end of the tubular extension 46 toward the image intensifier tube 90. Each of the arms 48 terminate in a stepped configuration having a ridge surface 92 and a sides element 93 that extends beyond the ridge surface 92. As the night vision monocular 10 is assembled, the face surface 94 of the image intensifier tube 90 abuts against the ridge surfaces 92 of the spacer arms 48. As a result, the spacer arms 48 retain the face surface 94 of the image intensifier tube 90 a predetermined distance from the tubular extension 46 on the face plate 40. As the image intensifier tube 90 abuts against the ridge surfaces 92 on the spacer arms 48, the side elements 93 of the space arms 48 pass along the sides of the image intensifier tube 90, thereby aligning the image intensifier tube 90 and preventing the image intensifier tube 90 from moving laterally. A slot 98 is disposed at the bottom of the image intensifier tube 90. A key projection 100 extends inwardly from the rearward wall 29 of the casing section 20 of the housing 12. The key projection 100 engages the slot 98 on the image intensifier tube 90, thereby preventing the image intensifier tube 90 from rotating.

A two piece circuit board assembly 102 is provided that contains the various circuit controls needed for the operation of the night vision monocular 10. The two piece circuit board assembly 102 includes a primary control board 104 and an image intensifier supply board 106. The image intensifier supply board 106 abuts against the rearward wall 29 of the housing casing 20. A notch 108 is formed in the bottom of the image intensifier supply board 106 that engages the key projection 100 extending from the wall 29. The engagement of the key projection 100 in the notch 108 retains the image intensifier supply board 106 in a set orientation against the rearward wall 29. A large aperture 110 is disposed in the center of the image intensifier supply board 106. When assembled, the large aperture 110 is concentric with the image intensifier tube 90 and the eyepiece lens assembly 80, so not to interfere with the passage of light from the image intensifier tube 90 to the eyepiece lens assembly 80.

Two electric contact pins 112 extend from the image intensifier supply board 106. The two pins 112 enter oppositely formed apertures (not shown) in the image intensifier tube 90, wherein the two pins 112 provide electrical power to the image intensifier tube 90. The pins 112 are the only physical interconnection between the image intensifier tube 90 and the electronic controls of the device. Accordingly, should the tube ever have to be replaced, no soldering needs to be performed. Rather, the image intensifier tube 90 need only be pulled free of the pins 112 and replaced.

A fiber optic conduit 114 is coupled to the image intensifier supply board 106. At one end of the fiber optic conduit 114, a LED 116 is positioned so as to shine light into the fiber optic conduit 114. The LED 116 is shielded so that emitted light only enters the fiber optic 114 and does not shine freely within the housing. The fiber optic conduit 114 extends into the large aperture 110 in the center of the image intensifier supply board 110. The fiber optic conduit 114 terminates at a tapered point 118 that is within the field of view of eyepiece lens assembly 80. By creating a taper at the end of the fiber optic conduit 114, total internal reflection is lost along the entire taper. As a result, when the LED 116 is lit, the entire tapered point 118 emits light. This creates a highly noticeable light indication superimposed over the viewed image.

An optional contact region 120 can be formed on the image intensifier supply board 106. The contact region 120 contains two metalized surfaces 122. Two electrical contacts (not shown) may be disposed on the rearward surface of the battery receptacle 42. As the night vision monocular 10 is assembled, the electrical contacts on the battery receptacle 42 would contact the metalized surfaces 122, thereby supplying electrical power from the batteries 51 in the receptacle 42 to the two piece circuit board assembly 102. In an alternative embodiment, the batteries 51 in the battery receptacle 42 may be wired to a connector 123 that couples to an opposite connector 124 that is connected to the two piece circuit board assembly 102. In such an embodiment, the two piece circuit board assembly 102 receives power when the two connectors 123, 124 are joined. In a similar manner, the leads that lead to the light sensor 62 and the infrared illuminator source 66 may also be connected to the two piece circuit board 102 via the two connectors 123, 124.

Two reed switches 130 are coupled to the two piece circuit board assembly 102. The reed switches 130 are positioned along each of the side walls within the housing casing 20. The reed switches 130 are retained in set orientations by locator ribs 132 that are molded as part of the plastic housing casing 20. Two push buttons 18, 19 are disposed on the top surface of the primary control board 104. The two push buttons 18, 19 extend through two apertures 126, 128 on the top surface 16 of casing portion of the housing 12, thereby enabling a person holding the night vision monocular to easily engage the two push buttons 18, 19. The primary control board 104 contains the control circuity needed for the operation of the night vision monocular 10.

Figure 3:
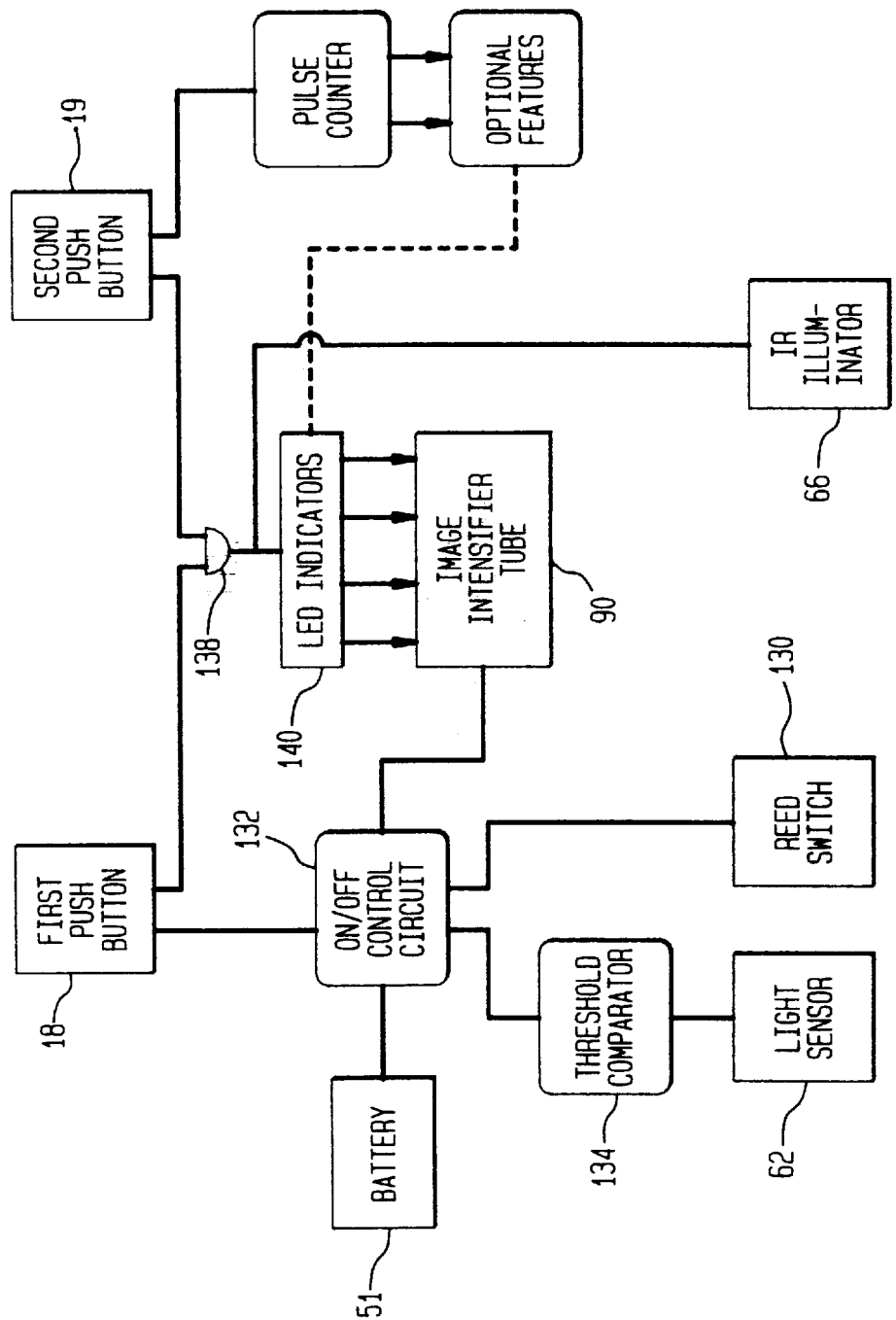
FIG. 3 is a block diagram illustrating the electronic features associated with the preferred embodiment of the present invention night vision monocular assembly.

Referring to FIG. 3 the control logic of the night vision monocular is shown. The first push button 18 is coupled to an on/off control circuit 132 that selectively controls the flow of electricity from the battery 51 to the image intensifier tube 90. As such, by pressing the first push button 18 once, the image intensifier tube 90 is enabled and by pressing the button 18 again the image intensifier tube 90 is disabled. Two other variables also have control upon the deactivation of the image intensifier tube 90. The first is light sensor 62. The light sensor 62 detects ambient light surrounding the night vision monocular. A threshold comparitor circuit 134 compares the light detected by the light sensor 62 to a threshold value. The threshold value is indicative of the brightness of ambient light that is capable of causing harm to the image intensifier tube 90. As a result, should a harmful amount of light be detected, the on/off control circuit 132 will be triggered and the image intensifier tube 90 will be automatically deactivated. Light sensitive tube shut-off circuits are well known in the art and are exemplified by U.S. Pat. No. 5,146,077 to Caserta et al., entitled GATED VOLTAGE APPARATUS FOR HIGH LIGHT RESOLUTION AND BRIGHT SOURCE PROTECTION OF IMAGE INTENSIFIER TUBE, which is assigned to ITT Corporation, the assignee herein.

The reed switches 130 are also coupled to the on/off control circuit 132 and are capable of automatically deactivating the night vision monocular when the night vision monocular is removed from a predetermined magnetic field. As will be later explained, the present invention monocular is capable of being mounted to a helmet in a manner that enables the monocular to be "flipped-up" out of the field of view when not in use. The helmet mount contains a magnet that is removed from close proximity with the monocular when it is flipped-up and out of the way. The magnet activates the reed switch 130, thereby automatically deactivating the monocular until it is flipped-down back into its operating position.

The first push button 18 and the second push button 19 are joined to an AND gate circuit 138. When both the first push button 18 and the second push button 19 are pushed simultaneously, the infrared illuminator 66 is activated. Furthermore, an LED indicator 140 is activated providing a visual indication, superimposed over the image of the image intensifier tube 90, that enables a viewer to realize that the infrared illuminator 66 has be activated.

Optionally, additional features can be included within the circuity of the night vision monocular. Those optional features may include a low battery detection circuit, a run time meter, variable gain, a security code enablement feature and the like. All such optical features may be selected from a menu, wherein the features are enabled by the various combinations of switch actuations.

Figure 4:
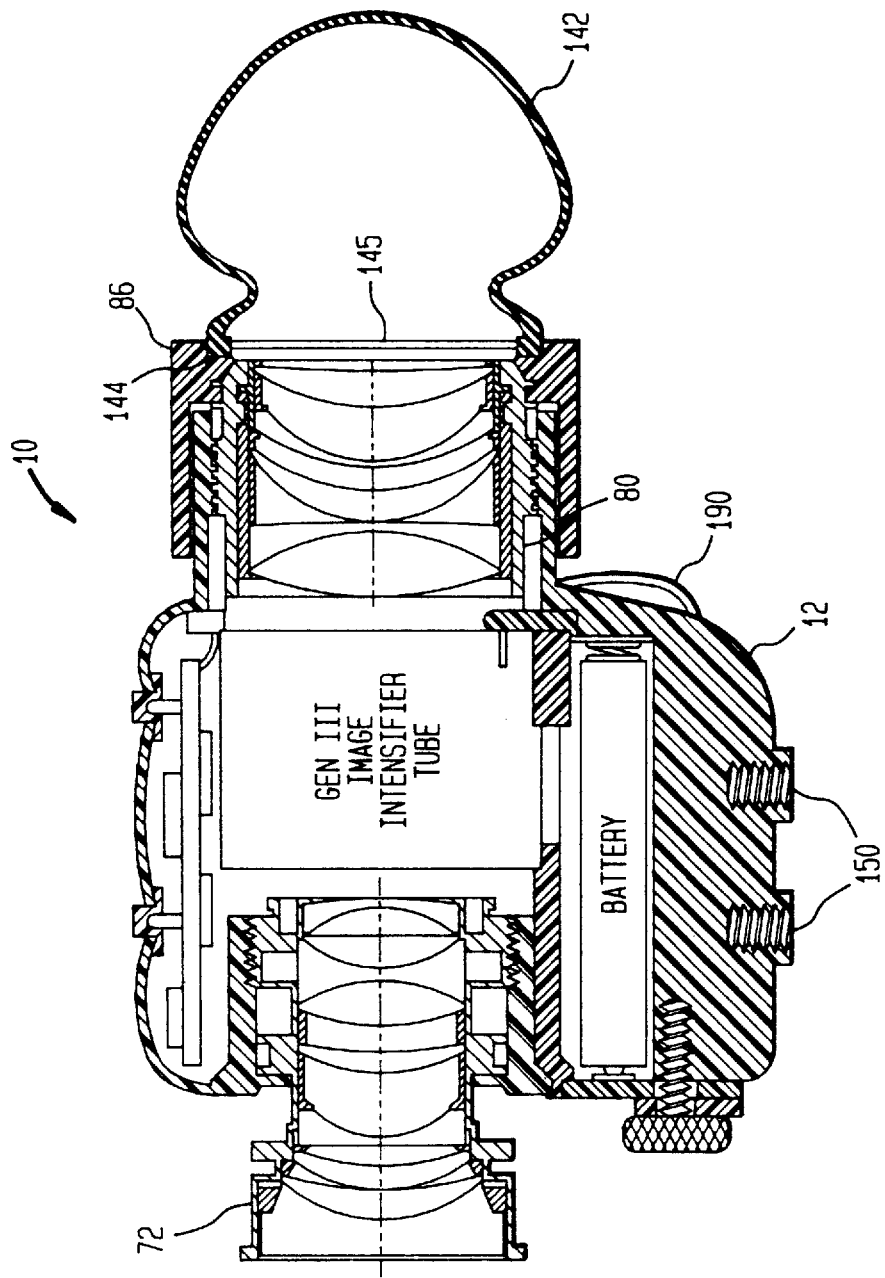
FIG. 4 is a selective cross-sectional view of the present invention night vision monocular assembly.

Referring to FIG. 4, the optics contained within the objective lens assembly 72 and eyepiece lens assembly 80 are shown. The optics contained within the objective lens assembly 72 are known in the art, being the same as are found in the objective of the military AN/AVS-6 night vision system. The optics contained within the eyepiece lens assembly 80 also are the same as the eyepiece optics of the AN/AVS-6 night vision system, which provide a 6 mm exit pupil at a 25 mm eye relief The large eye relief enables a person to maintain full field of view when wearing glasses or a mask. An eye cup 142 is provided that shields the eye when the night vision monocular 10 is in use. The eye cup 142 engages a groove 144 in the eyepiece focus knob 86, with only an interference fit. As such, the eye cup 142 can be rotated, or removed as desired. A sacrificial window 145 is coupled to the focus knob 86 proximate the eye cup 142. The window 145 is coated with an antifog compound that prevents condensation on the window 145 that would otherwise be likely with the use of the eye cup 142.

Two threaded mounting holes 150 are formed on the bottom surface of the monocular housing 12. The mounting holes 150 join to a variety of adaptor assemblies that enable the monocular to be used in a plurality of applications. Referring back to FIG. 1, a weapon sight rail 152 is shown. The sight rail 152 is a clamp-like structure that attaches to a dovetail ridge manufactured as part of many handheld weapons. The sight rail 152 is tightened onto the weapon by the tightening of the knurled knob 156 in typical prior art fashion. Two holes 154, are formed in the top surface 155 of the sight rail 152. As such, the sight rail 152 can be attached to the night vision monocular 10, via screws 156. Once the sight rail 152 is affixed to the night vision monocular 10, the night vision monocular 10 can be mounted on a weapon and used as a weapon sight.

In FIG. 1, a head/helmet mount adaptor 160 is also shown. The head/helmet mount adaptor 160 includes a male coupling element 162 identical to that used in the prior art AN/PVS-7B night vision goggle system. As such, the head/helmet mount adaptor 160 can be connected to any helmet that has an ANIPVS-7B female mount attached thereto or to the ANIPVS-7B head mount. A bracket 164 extends downwardly from the male coupling element 162. A threaded fastener 166 extends through the bracket 164, wherein the threaded fastener 168 is sized to engage one of the mounting holes 150 (FIG. 3) on the bottom of the night vision monocular 10. A stud 168 also extends from the bracket 164, wherein the stud 168 enters the second of the two mounting holes on the bottom of the night vision monocular 10. The bracket 164 is shaped and sized so that it is capable of supporting the night vision monocular 10 in front of either eye of an individual wearing a head or helmet mount with a AN/PVS-7B mounting. By reversing the direction of the head/helmet mount adaptor 160 relative to the night vision monocular 10, the night vision monocular 10 can be selectively held over either the left or right eye.

In the preferred embodiment, a lens cap 170 is provided for covering the objective lens of the monocular. A pin hole 172 is provided within the center of the lens cap 70 so that a person can train or test the monocular during normal lighting conditions. A novel handstrap 175 is also provided. The handstrap 175 includes an elongated strap of material 176 having a first end 178 and a second end 179. An elastic element 180 extends from the first end 178 of the strap 176. The elastic element 180 forms an eyelet 182 through which the port cover threaded fastener 57 passes. This configuration serves two functions. First, it anchors the first end 178 of the strap 176 to the night vision monocular 10. Second, the strap 176 retains the battery port 52 when it is opened, thereby preventing the battery port 52 from being dropped or lost in the dark.

A tether line 184 also extends from the first end 178 of the strap 176. The tether line 184 attaches to the lens cap, thereby preventing the lens cap from becoming lost. The second end 179 of the strap 176 passes through a hook latch 190 (FIG. 4) on the monocular housing 12, and is folded back against itself. Hook and Loop fasteners are coupled to the strap 176 so that the second end 179 of the strap 176 remains in its folded orientation. An enlarged pad 189 is also coupled to the strap 176. The pad 189 provides a larger surface area for contact with the back of the hand when the monocular is held. An optional hook eye 191 can also be coupled to the strap 176, thereby enabling the night vision monocular 10 to be attached to a hook or other such element.

It will be understood that the night vision monocular assembly described herein is merely exemplary and that a person skilled in the art may make many variations and modifications to the described embodiments utilizing functionally equivalent components to those described. All such variations and modifications are intended to be included within the scope of this invention as defined by the appended claims.

What is claimed is:

1. A night vision monocular, comprising:
    a housing having a primary housing section and a removable secondary housing section;
    an objective lens assembly for receiving low intensity light;
    an image intensifier tube for creating a visible image from light collected by said objective lens assembly; and
    an eyepiece lens assembly for viewing the image created by the image intensifier tube;
    wherein said primary housing section retains said image intensifier tube and eyepiece assembly and said secondary housing section retains said objective lens assembly, said objective lens assembly, said image intensifier tube and said eyepiece lens assembly being axially aligned to define a common optical axis of said monocular.

2. The monocular according to claim 1, wherein said primary housing section defines a large open end that is covered by said secondary housing section, said open end being sized to permit the passage of said image intensifier tube therethrough.

3. The monocular according to claim 1, wherein a battery receptacle is coupled to said secondary housing section, said battery receptacle extending into said primary housing section when said secondary housing section is joined to said primary housing section.

4. The monocular according to claim 1, further including spacer elements extending from said secondary housing section into said primary housing section, said spacer elements engaging said image intensifier tube, thereby retaining said image intensifier tube in a predetermined spacial relationship with respect to said secondary housing section.

5. The monocular according to claim 1, further including an infrared illuminator and a light sensor coupled to said secondary housing section.

6. A night vision monocular according to claim 1 further comprising a circuit board disposed between the image intensifier tube and the eyepiece lens assembly, wherein the circuit board has electrical contacts thereon that provide power to the image intensifier tube as the image intensifier tube abuts against the circuit board.

7. A night vision monocular according to claim 1 further comprising a night adaptor selectively attachable to the night vision monocular housing assembly for attaching the night vision monocular to a helmet, wherein the helmet adaptor can be selectively attached to the night vision monocular assembly in one of two orientations thereby enabling the helmet adaptor to support the night vision monocular in front of either eye of a person wearing the helmet.

8. A night vision monocular, comprising:

an objective lens assembly for receiving low intensity light;

an image intensifier tube for creating a visible image from light collected by said objective lens assembly;

an eyepiece lens assembly for viewing the image created by the image intensifier tube;

a housing assembly for concentrically retaining said objective lens assembly, said image intensifier tube and said eyepiece lens assembly along a common optical axis, said housing assembly having a primary housing section and a removable secondary housing section separable along a plane generally perpendicular to said optical axis, wherein said primary housing section retains said image intensifier tube and eyepiece assembly and said secondary housing section retains said objective lens assembly; and a battery receptacle is coupled to said secondary housing section, said battery receptacle extending into said primary housing section when said secondary housing section is joined to said primary housing section.

* * * * *